(12) United States Patent
Shimoji

(10) Patent No.: US 10,868,633 B2
(45) Date of Patent: Dec. 15, 2020

(54) WIRELESS COMMUNICATION DEVICE, WIRELESS COMMUNICATION METHOD AND PROGRAM

(71) Applicant: Silex Technology, Inc., Kyoto (JP)

(72) Inventor: Ryuji Shimoji, Kyoto (JP)

(73) Assignee: Silex Technology, Inc., Kyoto (JP)

( * ) Notice: Subject to any disclaimer, the term of this patent is extended or adjusted under 35 U.S.C. 154(b) by 0 days.

(21) Appl. No.: 16/465,112

(22) PCT Filed: Nov. 20, 2017

(86) PCT No.: PCT/JP2017/041723
§ 371 (c)(1),
(2) Date: May 29, 2019

(87) PCT Pub. No.: WO2018/101110
PCT Pub. Date: Jun. 7, 2018

(65) Prior Publication Data
US 2019/0386768 A1 Dec. 19, 2019

(30) Foreign Application Priority Data
Nov. 30, 2016 (JP) .................................. 2016-233202

(51) Int. Cl.
*H04L 1/00* (2006.01)
*H04L 5/00* (2006.01)
(Continued)

(52) U.S. Cl.
CPC .......... *H04L 1/0002* (2013.01); *H04L 1/1685* (2013.01); *H04L 5/0055* (2013.01);
(Continued)

(58) Field of Classification Search
CPC ... H04L 1/0002; H04L 5/0055; H04L 1/1685; H04W 24/10; H04W 24/08; H04W 84/12
(Continued)

(56) References Cited

U.S. PATENT DOCUMENTS 8,929,319 B2 * 1/2015 Anderson ............. H04L 5/0037
370/329
2010/0128705 A1 5/2010 Miyoshi
(Continued)

FOREIGN PATENT DOCUMENTS

JP 2005039722 A 2/2005
JP 2007306423 A 11/2007
(Continued)

OTHER PUBLICATIONS

International Search Report and Written Opinion for International Application Serial No. PCT/JP2017/041723 dated Feb. 6, 2018.
(Continued)

*Primary Examiner* — Faisal Choudhury
(74) *Attorney, Agent, or Firm* — K&L Gates LLP; Louis C. Cullman; Dennis A. Majewski

(57) ABSTRACT

A transmission success probability calculator (114) calculates a transmission success probability that is a probability of receiving an ACK frame from another wireless communication device during a preset first reference period after transmission of an inspection frame, the inspection frame being transmitted multiple times to another wireless communication device. A transmission attempt possible count calculator (115) calculates a transmission attempt possible count of the inspection frame during a second reference period. A timeout occurrence rate calculator (116) calculates, from the transmission success probability and the transmission attempt possible count, a timeout occurrence rate that is a probability of not receiving the ACK frame from the wireless communication device even through the inspection frame is repeatedly transmitted by the transmission attempt possible count within the second reference period. A selector (117) selects an MCS to use in communication with the other wireless communication device in accordance with whether (Continued)

the timeout occurrence rate is less than or equal to a preset occurrence rate threshold.

15 Claims, 13 Drawing Sheets

(51) Int. Cl.
    *H04L 1/16*     (2006.01)
    *H04W 24/08*     (2009.01)
    *H04W 24/10*     (2009.01)
    *H04W 84/12*     (2009.01)

(52) U.S. Cl.
    CPC ........... *H04W 24/08* (2013.01); *H04W 24/10* (2013.01); *H04W 84/12* (2013.01)

(58) Field of Classification Search
    USPC ........................................................ 370/329
    See application file for complete search history.

(56) References Cited

U.S. PATENT DOCUMENTS

| | | | | |
|---|---|---|---|---|
| 2010/0278152 | A1* | 11/2010 | Andreozzi | H04L 47/626 370/335 |
| 2011/0149919 | A1* | 6/2011 | Kapoor | H04L 1/1848 370/336 |
| 2011/0211513 | A1* | 9/2011 | Coleri Eregen | H04W 52/0274 370/311 |
| 2015/0099534 | A1* | 4/2015 | Nagata | H04B 15/00 455/456.1 |
| 2015/0372897 | A1* | 12/2015 | Han | H04L 47/00 370/254 |
| 2016/0057647 | A1 | 2/2016 | Sullivan et al. | |
| 2018/0184456 | A1 | 6/2018 | Subramani et al. | |
| 2019/0297521 | A1 | 9/2019 | Sullivan et al. | |

FOREIGN PATENT DOCUMENTS

| | | |
|---|---|---|
| JP | 2009049829 A | 3/2009 |
| JP | 2010087730 A | 4/2010 |
| JP | 2010098739 A | 4/2010 |
| WO | 2016/027063 A1 | 2/2016 |
| WO | 2016/156766 A1 | 10/2016 |
| WO | 2018/101110 A1 | 6/2018 |

OTHER PUBLICATIONS

Extended European Search Report, dated Jun. 3, 2020, for corresponding European Patent Application No. 17876649.9.
Kim et al., Probing-based link adaptation for high data rate wireless LANs. IEEE Transactions on Wireless Communications, vol. 11, No. 7, pp. 2382-2390 (2012).

* cited by examiner

FIG. 4

DBPS INFORMATION STORAGE 132

| MCS VALUE | DBPS |
|---|---|
| 13 | 416 |
| ⋮ | ⋮ |
| 4 | 156 |
| ⋮ | ⋮ |
| 0 | 26 |

FIG. 7

| MCS VALUE | TRANSMISSION SUCCESS PROBABILITY | TRANSMISSION ATTEMPT POSSIBLE COUNT | TRANSMISSION TIMEOUT OCCURRENCE RATE |
|---|---|---|---|
| [0](MCS0) | XXX/YYY | 8 | B0 |
| [1](MCS1) | XXZ/YYY | 15 | B1 |
| . | . | . | . |
| . | . | . | . |
| . | . | . | . |
| [7](MCS7) | ZZZ/YYY | 52 | B7 |

FIG. 11

DBPS INFORMATION STORAGE 132

| MCS VALUE | MODULATION SCHEME | DBPS |
|---|---|---|
| 13 | 64-QAM | 416 |
| ⋮ | ⋮ | ⋮ |
| 4 | 16-QAM | 156 |
| ⋮ | ⋮ | ⋮ |
| 0 | BPSK | 26 |

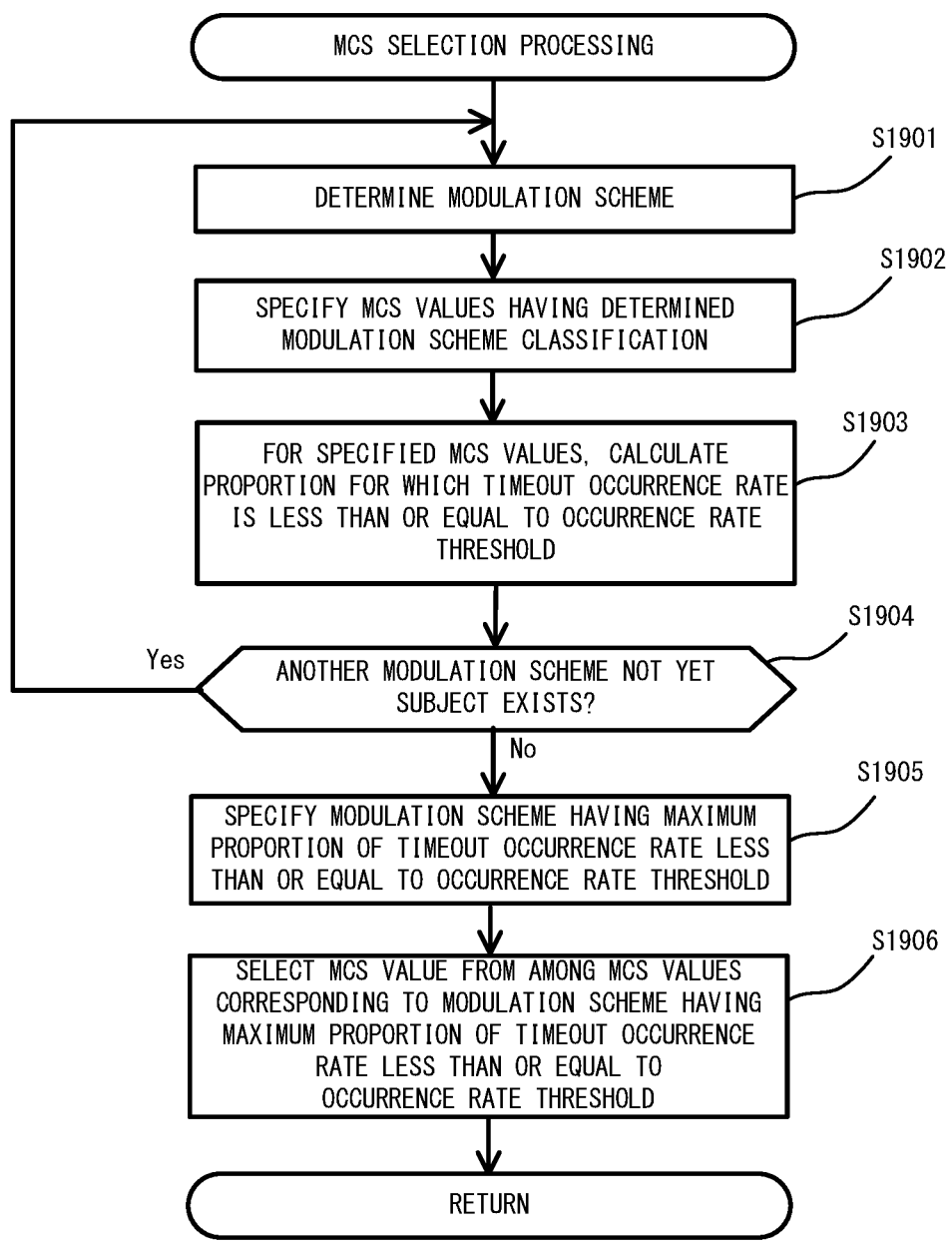

WIRELESS COMMUNICATION DEVICE, WIRELESS COMMUNICATION METHOD AND PROGRAM

PRIORITY CLAIM

This application is a national phase of PCT/JP2017/041723, filed on Nov. 20, 2017, which claims priority to Japanese Patent Application No. 2016-233202, filed on Nov. 30, 2016, the entire disclosure of which are incorporated by reference herein.

TECHNICAL FIELD

The present disclosure relates to a wireless communication device, a wireless communication method, and a program.

BACKGROUND ART

A wireless communication device is proposed that performs communication by switching between multiple encoding schemes and modulation schemes (for example, see Patent Literature 1). By changing the modulation and coding scheme (MCS) in response to success/failure of communication and/or a retransmission count of the same data, this wireless communication device attempts to suppress consecutive retransmissions and improve a communication rate.

CITATION LIST

Patent Literature

Patent Literature 1: Unexamined Japanese Patent Application Kokai Publication No. 2010-87730

SUMMARY OF INVENTION

Technical Problem

However, when using the wireless communication device described in Patent Literature 1, after the start of normal communication with another wireless communication device, a certain degree of frame loss may occur during searching for an MCS value suitable for communication with the other wireless communication device while changing the MCS value.

In consideration of the aforementioned circumstances, an objective of the present disclosure is to provide a wireless communication device, a wireless communication method, and a program that enables a decrease in frame losses.

Solution to Problem

In order to attain the aforementioned objective, the wireless communication device according to the present disclosure includes:

a transmission success probability calculator configured to calculate a transmission success probability that is a probability of receiving a confirmation response frame from another wireless communication device within a preset first reference period after transmission of a first frame, the first frame being transmitted multiple times to the other wireless communication device;

a transmission attempt possible count calculator configured to calculate a transmission attempt possible count of the first frame during a second reference period;

a timeout occurrence rate calculator configured to calculate, from the transmission success probability and the transmission attempt possible count, a timeout occurrence rate that is a probability of not receiving, within the second reference period, the confirmation response frame from the other wireless communication device even through the first frame is repeatedly transmitted, the number of repeated transmissions being the transmission attempt possible count; and a selector configured to select a modulation and coding scheme to use in communication with the other wireless communication device in accordance with whether the timeout occurrence rate is less than or equal to a preset occurrence rate threshold.

A wireless communication method according to another aspect of the present disclosure includes:

a step of calculating a transmission success probability that is a probability of receiving a confirmation response frame from another wireless communication device within a preset first reference period after transmission of a first frame, the first frame being transmitted multiple times to the other wireless communication device;

a step of calculating a transmission attempt possible count of the first frame during a second reference period;

a step of calculating, from the transmission success probability and the transmission attempt possible count, a timeout occurrence rate that is a probability of not receiving, within the second reference period, the confirmation response frame from the other wireless communication device even through the first frame is repeatedly transmitted, the number of repeated transmissions being the transmission attempt possible count; and a step of selecting a modulation and coding scheme to use in communication with the other wireless communication device in accordance with whether the timeout occurrence rate is less than or equal to a preset occurrence rate threshold.

A program according to another aspect of the present disclosure causes a computer to function as:

a transmission success probability calculator configured to calculate a transmission success probability that is a probability of receiving a confirmation response frame from another wireless communication device within a preset first reference period after transmission of a first frame, the first frame being transmitted multiple times to the other wireless communication device;

a transmission attempt possible count calculator configured to calculate a transmission attempt possible count of the first frame during a second reference period;

a timeout occurrence rate calculator configured to calculate, from the transmission success probability and the transmission attempt possible count, a timeout occurrence rate that is a probability of not receiving, within the second reference period, the confirmation response frame from the other wireless communication device even through the first frame is repeatedly transmitted, the number of repeated transmissions being the transmission attempt possible count; and a selector configured to select a modulation and coding scheme to use in communication with the other wireless communication device in accordance with whether the timeout occurrence rate is less than or equal to a preset occurrence rate threshold.

Advantageous Effects of Invention

By use of the wireless communication device according to the present disclosure, the timeout occurrence rate calculator calculates the timeout occurrence rate from the transmission success probability and the transmission attempt possible count of the first frame, and the selector selects the modulation and coding scheme used for communication with the other wireless communication device in accordance with whether the timeout occurrence rate is less than or equal to the preset occurrence rate threshold. Due to such configuration, for example, the wireless communication device, firstly after the selector selects a modulation and coding scheme having a low timeout occurrence rate, can start normal communication with the other wireless communication device using the selected modulation and coding scheme. Therefore, frame loss is reduced in comparison to a configuration that, after the wireless communication device starts normal communication with the other wireless communication device, it searches for a modulation and coding scheme suitable for communication with the other wireless communication device.

BRIEF DESCRIPTION OF DRAWINGS

FIG. 4 illustrates content of a DBPS information storage according to the embodiment;

FIG. 7 illustrates an example of a display screen displayed on a monitor of a PC connected to the wireless communication device according to the embodiment;

FIG. 11 illustrates content of a DBPS information storage according to a modified example; and FIG. 12 is a flowchart illustrating MCS selection processing executed by the wireless communication device according to the modified example.

DESCRIPTION OF EMBODIMENTS

A communication system according to an embodiment of the present disclosure is described below in detail with reference to drawings.

The wireless communication device according to the present embodiment performs semi-permanent wireless communication with a specific wireless communication device. This wireless communication device has a function for selection of a modulation and coding scheme (referred to hereinafter as an MCS) suitable for communication with the specific wireless communication device serving as a communication counterparty. Further, at the setting time, the wireless communication device selects the MCS suitable for communication with the specific wireless communication device, and thereafter, performs communication with the specific wireless communication device by the selected MCS. Such operation reduces the occurrence of frame loss in the communication between this wireless communication device and the specific wireless communication device. The wireless communication device calculates a timeout occurrence rate of an inspection frame on the basis of (i) transmission success probability and (ii) size of the inspection frame, when transmission of the inspection frame is attempted multiple times to the specific wireless communication device serving as the communication counterparty by multiple MCSs. Thereafter, the wireless communication device selects an MCS that is suitable for communication with the specific wireless communication device on the basis of the calculated timeout occurrence rate.

Figure 1:
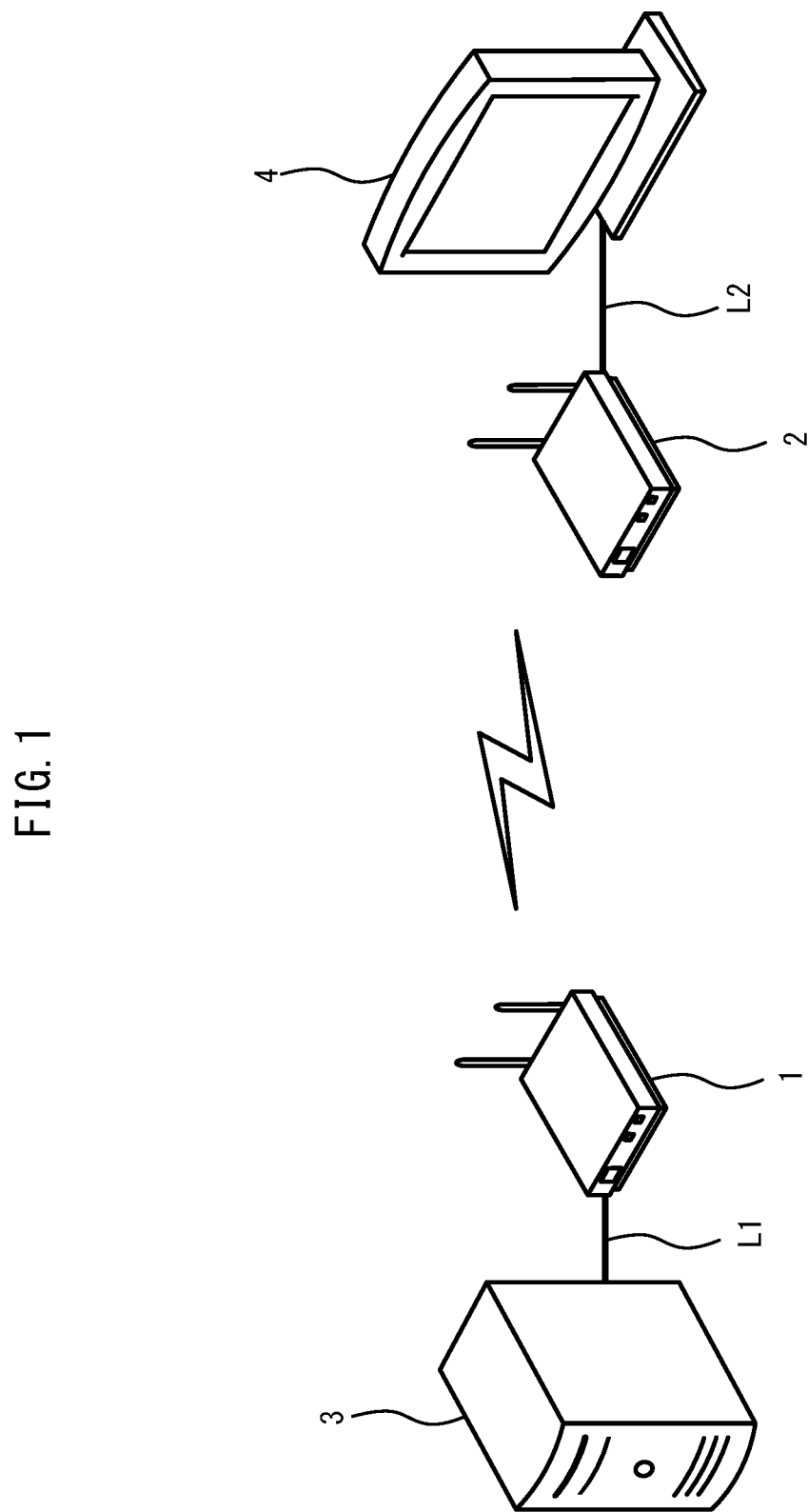
FIG. 1 illustrates a configuration of a communication system according to an embodiment of the present embodiment.

One example of the wireless communication system according to the present embodiment, as illustrated in FIG. 1, is equipped with wireless communication devices 1 and 2, a personal computer (PC) 3, and a monitor 4. The wireless communication device 1 is connected to the PC 3 via signal line L1. The wireless communication device 2 is connected to the monitor 4 via a signal line L2. The PC 3 generates video data, and outputs the generated video data to the wireless communication device 1 via the signal line L1. The wireless communication device 1 converts the video data outputted from the PC 3 to a wireless signal that is transmitted to the wireless communication device 2. The wireless communication device 2 converts the wireless signal received from the wireless communication device 1 to video data that is outputted to the monitor 4. The monitor 4 displays the video on the basis of the video data inputted from the wireless communication device 2. Note that the wireless communication system according to the present embodiment is not limited to use in the transfer of the video data illustrated in FIG. 1. For example, the wireless communication system is suitable for instances such as when, although positional relationships of two wireless communication devices do not change within a manufacturing plant, connection between the devices by a wired network is difficult due to layout of the manufacturing plant interior. Moreover, although the wireless communication system according to the present embodiment illustrates one-to-one communication between the wireless communication device 1 and the wireless communication device 2, the wireless communication system can be used for one-to-N communication.

Figure 2:
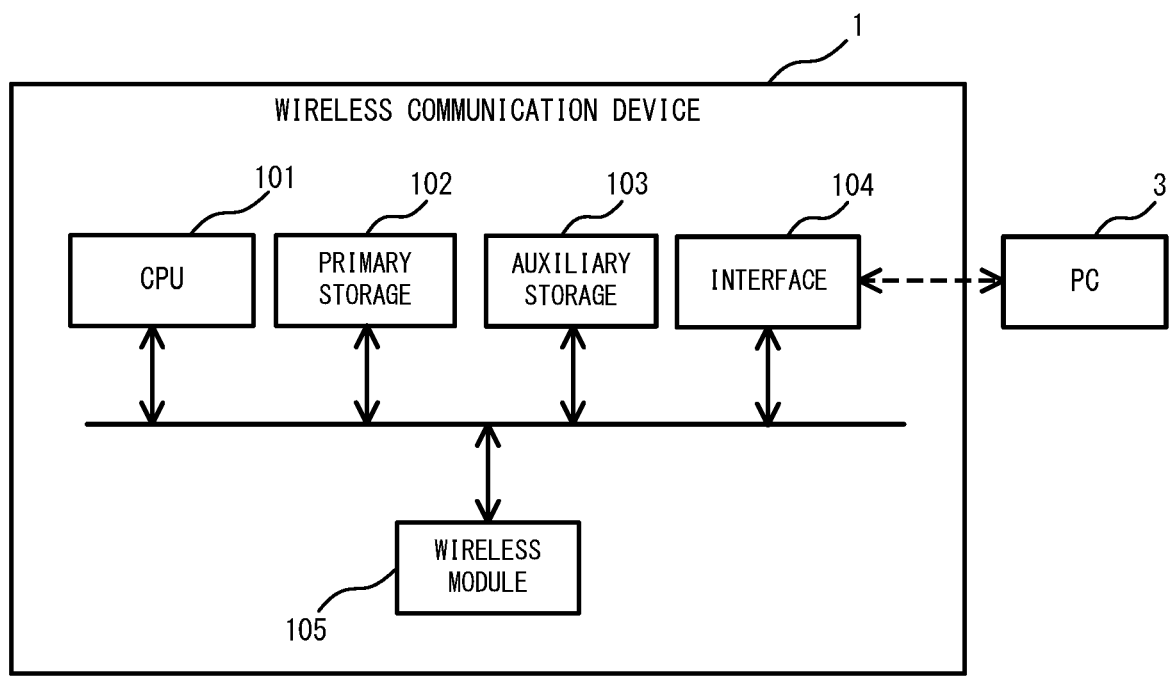
FIG. 2 illustrates a hardware configuration of a wireless communication device according to the embodiment.

Next, a hardware configuration of the wireless communication device 1 according to the present embodiment is described. As illustrated in FIG. 2, the wireless communication device 1 is equipped with a central processing unit (CPU) 101, a primary storage 102, an auxiliary storage 103, an interface 104, and a wireless module 105. The primary storage 102 consists of volatile memory and is used as a working region of the CPU 101. The auxiliary storage 103 consists of non-volatile memory and stores control programs, content, or the like. The CPU 101 reads and then writes to the primary storage 102 and executes the control programs stored in the auxiliary storage 103. The interface 104 is connected to the PC 3 and executes protocol conversion of the data transmitted to and received from the PC 3.

The wireless module 105 establishes a communication link with the wireless communication device 2 and performs wireless communication. The wireless module 105 has an antenna and a signal generation circuit that generates the wireless signal. The wireless module 105 communicates by a communication method compatible with a wireless LAN specification such as IEEE 802.11a, b, g, n, or the like.

Figure 3:
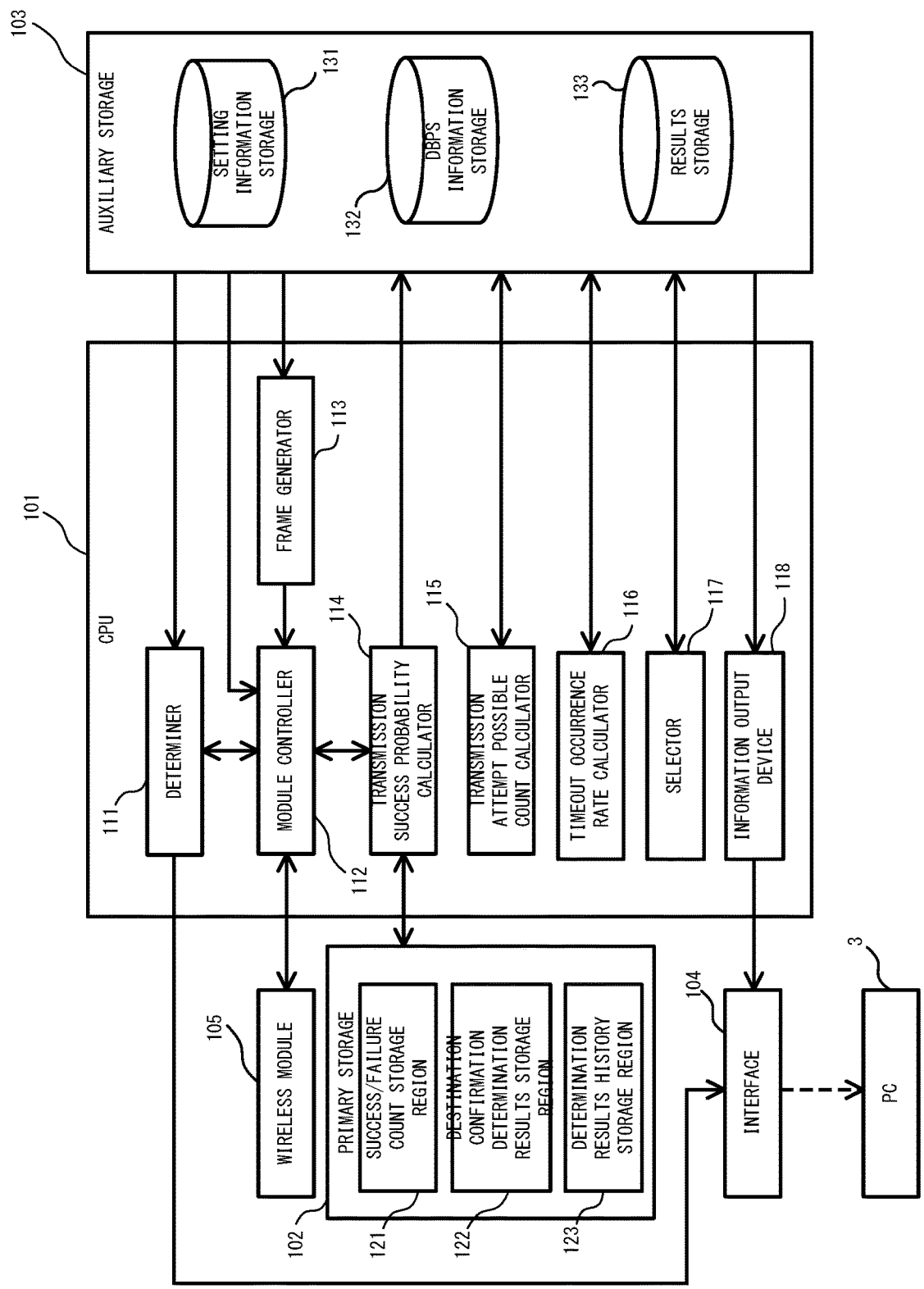
FIG. 3 illustrates a functional configuration of the wireless communication device according to the embodiment.

Functional configuration of the wireless communication device 1 according to the present embodiment is described next. The wireless communication device 1 functions as the various components illustrated in FIG. 3 by the CPU 101 reading the control programs stored in the auxiliary storage 103, writing to the primary storage 102, and executed such programs. That is to say, the CPU 101 executes the control programs and functions as a determiner 111, a module controller 112, a frame generator 113, a transmission success probability calculator 114, a transmission attempt possible count calculator 115, a timeout occurrence rate calculator 116, a selector 117, and an information output device 118. Moreover, a success/failure count storage region 121, a destination confirmation determination results storage region 122, and a determination results history storage region 123 are arranged in the primary storage 102. The success/failure count storage region 121 stores a transmission success count and a transmission failure count of the inspection frame. The destination confirmation determination results storage region 122 is used for below-described destination confirmation processing. The determination results history storage region 123 stores history of results of determination of transmission failure or transmission success of the inspection frame. Moreover, the primary storage 102 stores a totalization processing counter for counting a number of repeats of below-described success/failure count totalization processing, and stores a status flag indicating a communication state between the wireless communication devices 1 and 2. Furthermore, the primary storage 102 stores a determination counter for counting a number of repeats of determination of whether transmission of the inspection frame is successful or not.

The auxiliary storage 103 has a setting information storage 131, a DBPS information storage 132, and a results storage 133. The setting information storage 131 stores a MAC address of the wireless communication device 2 that is a communication counterparty of the wireless communication device 1 and a channel used for communication. Moreover, the setting information storage 131 stores (i) a first reference period, a second reference period, and a third reference period used in determination of success-failure of transmission of the inspection frame and the confirmation frame to the wireless communication device 2, and (ii) an occurrence rate threshold with respect to the timeout occurrence rate used in the below-described MCS setting processing. Furthermore, the setting information storage 131 stores a size of the inspection frame, a totalization processing repetition count that is a number of repeats of the below-described success/failure count totalization processing, and a destination confirmation transmission count specifying a count of repeated transmissions of the confirmation frame in the below-described destination confirmation processing. The totalization processing repetition count and the destination confirmation transmission count are both set beforehand, and for example, are set to 1,000. Moreover, the setting information storage 131 stores a determination repetition count for determination of a repetition count of determinations of whether the transmission of the inspection frame is successful. This determination repetition count is preset, and for example, is set to 100.

The DBPS information storage 132, for example as illustrated in FIG. 4, stores a count of data bits per symbol (DBPS) in association with an MCS value identifying each MCS.

The results storage 133, stores the transmission success probability and the timeout occurrence rate in association with the MCS value, when the inspection frame being transmitted multiple times to the wireless communication device 2 by multiple MCSs. Moreover, the results storage 133 stores, in association with the MCS value, a transmission attempt possible count which is determined from the size of the inspection frame, a determination period used in the determination of inspection frame transmission failure, and the DBPS corresponding to each MCS value.

The frame generator 113 generates (i) a confirmation frame used for checking whether the wireless communication device 2 that is the communication counterparty of the wireless communication device 1 is in a communication-capable state, and (ii) an inspection frame used for selecting the MCS suitable for communication with the wireless communication device 2.

The module controller 112 executes starting and stopping of the wireless module 105. Moreover, the module controller 112 transmits, via the wireless module 105 to the wireless communication device 2, the confirmation frame and the inspection frame generated by the frame generator 113.

The determiner 111 determines whether a utilization channel stored in the setting information storage 131 is useable. Specifically, the determiner 111 determines whether the utilization channel is useable within the country of Japan, for example. In this case, the auxiliary storage 103 stores beforehand channel information indicating channels that can be used within the country of Japan, and the determiner 111 refers to such channel information and determines whether the utilization channel is useable. Moreover, the determiner 111 determines whether the wireless communication device 2 serving as the communication counterparty of the wireless communication device 1 is in the communication-capable state. Here, the confirmation frame (second frame) is transmitted multiple times to the wireless communication device 2, and the determiner 111 determines whether an acknowledge (ACK) frame (confirmation response frame) is received from the wireless communication device 2 within a third reference period after transmission of the confirmation frame. The third reference period is preset, for example, to 4 msec. Upon determination that the wireless communication device 2 does not exist, the determiner 111 outputs alarm information to the PC 3 via the interface 104.

When the inspection frame (first frame) is transmitted toward the wireless communication device 2 multiple times, the transmission success probability calculator 114 calculates a transmission success probability that is a probability that the ACK frame is received from the wireless communication device 2 within a first reference period after the transmission of the inspection frame. The first reference period is preset, for example, to 4 msec. Upon multiple transmissions of the inspection frame toward the wireless communication device 2, the transmission success probability calculator 114 calculates the transmission succession probability by repeated execution of below-described success/failure count totalization processing where the transmission success count and the transmission failure count are totalized. The transmission success probability calculator 114 causes the results storage 133 to store the calculated transmission success probability corresponding to each MCS value.

The transmission attempt possible count calculator 115 calculates a transmission attempt possible count of inspection frames occurring within the second reference period. The transmission attempt possible count calculator 115 calculates a band occupancy period during transmission of the inspection frame, which is based on the data bits per symbol (DBPS, transmission rate) corresponding to the MCS used for transmission of the inspection frame and the size of data included in the inspection frame. Then, the transmission attempt possible count calculator 115 calculates the transmission attempt possible count on the basis of a ratio of the calculated band occupancy period to the second reference period. Specifically, the transmission attempt possible count calculator 115 firstly acquires a size of the inspection frame from the setting information storage 131, and acquires from the DBPS information storage 132 the DBPS corresponding to the MCS that is the subject of calculation of the transmission attempt possible count. Then, the transmission attempt possible count calculator 115, using the relational expression of the below-listed Formula (1), calculates the band occupancy period, for the case where the inspection frame is transmitted by the MCS that is the subject of calculation.

[Equation 1]

$$TX(j) = TX_{pre} + Roundup\left(\frac{L}{DBPS(j)}\right) \times TX_{sym} + TX_{ACK} \quad (1)$$

Here, j indicates the MCS value; TX(j) indicates the band occupancy period in the case of transmission of the inspection frame with the MCS of value "j"; L corresponds to the inspection frame size; and DBPS(j) is the DBPS corresponding to the MCS value "j". Moreover, $TX_{pre}$ indicates a band occupancy period of a preamble of the inspection frame; $TX_{sym}$ indicates a band occupancy period per single symbol; and $TX_{ACK}$ indicates a wait period of the ACK frame transmitted from the wireless communication device 2. Further, Roundup("*") indicates a function that performs rounding up of the decimal fraction of the value "*". For example, the size L of the inspection frame is taken to be 1,000 bytes (8,000 bits), the value of the MCS that is the subject of calculation of the transmission attempt possible count is "13", the band occupancy period $TX_{pre}$ of the preamble of the inspection frame and the wait period of the ACK frame $TX_{ACK}$ are each 40 μsec, and the band occupancy period per single symbol $TX_{sym}$ is 3.6 μsec. In this case, the band occupancy period TX(j) in the case of transmission of the inspection frame is 152 μsec.

Then, the transmission attempt possible count calculator 115 calculates the transmission attempt possible count from the second reference period and the band occupancy period calculated using the aforementioned Formula (1). Specifically, the transmission attempt possible count calculator 115 uses the relational expression of the below-listed Formula (2) to calculate the transmission attempt possible count.

[Equation 2]

$$R(j) = Rounddown\left(\frac{S}{TX(j)}\right) \quad (2)$$

Here, j indicates the MCS value, and R(j) indicates the transmission attempt possible count in the case of transmission of the inspection frame by the MCS corresponding to the MCS value "j". Further, TX(j) indicates band occupancy period in the case of transmission of the inspection frame by the MCS corresponding to the MCS value "j" found by the Formula (1), and S indicates the second reference period. Further, Rounddown("*") indicates a function for rounding down the decimal fraction of the value "*". For example, the band occupancy period TX(j) during sending of the inspection frame is taken to be 152 μsec, and the second reference period is 4 msec. In this case, the transmission attempt count of the inspection frame is 26. Moreover, the transmission attempt possible count calculator 115 causes the results storage 133 to store the calculated transmission attempt possible count corresponding to each MCS value.

The timeout occurrence rate calculator 116 calculates, from the transmission success probability and the transmission attempt possible count, the timeout occurrence rate that is the probability of not receiving the ACK frame from the wireless communication device 2 even through the inspection frame is repeatedly transmitted, where the number of repeated transmissions during the second reference period is the transmission attempt possible count. The timeout occurrence rate calculator 116 calculates the timeout occurrence rate using the relational expression of the below-listed Formula (3).

[Equation 3]

$$B(j) = (1-P(j))^{R(j)} \quad (3)$$

Here, j indicates the MCS value, and B(j) indicates the timeout occurrence rate in the case of transmission of the inspection frame by the MCS corresponding to the MCS value "j". Moreover, P(j) indicates the transmission success probability of the inspection frame, and R(j) indicates the transmission attempt possible count in the case of transmission of the inspection frame by the MCS with the value "j" which is determined by Formula (2). The timeout occurrence rate calculator 116 causes the results storage 133 to store the calculated timeout occurrence rate corresponding to each MCS value.

The selector 117 acquires the occurrence rate threshold from the setting information storage 131. Then, the selector 117 refers to the timeout occurrence rate corresponding to each MCS value stored by the results storage 133, and selects, from among the multiple MCS values, the MCSs for which the timeout occurrence rate is less than or equal to the occurrence rate threshold in the case of transmission of the inspection frame. The occurrence rate threshold is preset, for example, to $1 \times 10^{-16}$. The selector 117 causes the setting information storage 131 to store the selected MCS value.

The information output device 118 outputs information indicating the transmission success probability, the transmission attempt possible count, and the timeout occurrence rate corresponding to each MCS value and stored in the results storage 133, to the PC 3 via the interface 104.

Figure 5:
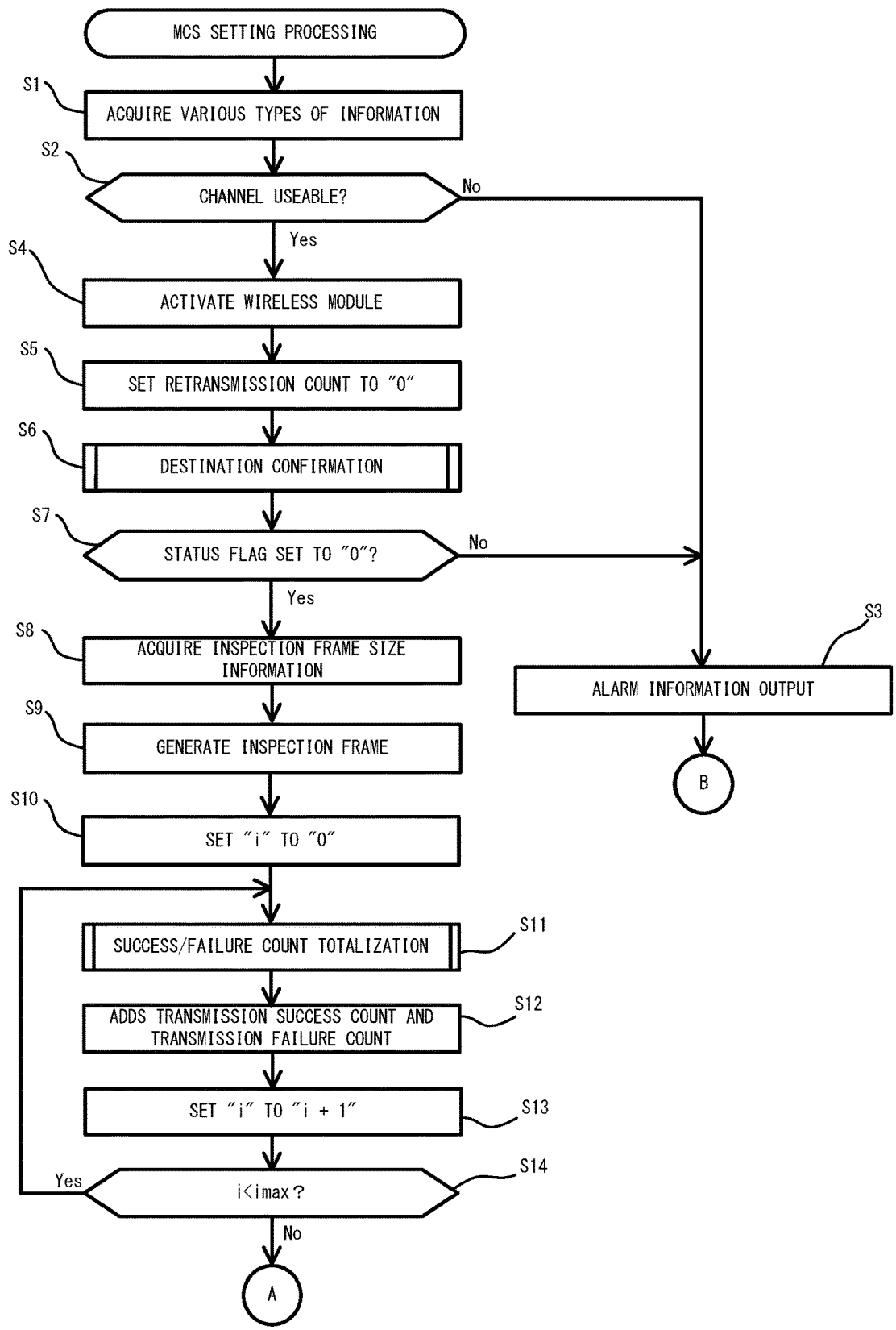
FIG. 5 is a flowchart illustrating MCS setting processing executed by the wireless communication device according to the embodiment.

Next, the MCS setting processing executed by the wireless communication device 1 according to the present embodiment is described in detail with reference to FIG. 5 through FIG. 7. This MCS setting processing is a process to set in the wireless communication device 1 an MCS suitable for communication between the wireless communication devices 1 and 2 prior to the start of normal wireless communication between the wireless communication devices 1 and 2. This MCS setting processing, for example, starts after the wireless communication device 1 is placed in a user-determined location, and then electrical power is turned on to the wireless communication device 1. Note that, at the start of this MCS setting processing, the wireless communication device 1 is set neither to execute the communication procedures of carrier sense multiple access with collision avoidance (CSMA/CA), nor to execute frame aggregation. Firstly, the determiner 111 acquires the various types of information set by the user and stored in the setting information storage 131 (step S1). The various types of information include information indicating the aforementioned MAC address of the wireless communication device 2, the utilization channel, the first reference period, the second reference period, the third reference period, the occurrence rate threshold, the size of the inspection frame, and the totalization processing repetition count.

Thereafter, the determiner 111 determines whether the utilization channel is useable (step S2). Upon determination that the utilization channel is not useable (NO in step S2), the determiner 111 outputs the alarm information to the PC 3 via the interface 104 (step S3). Then the MCS setting processing ends.

Meanwhile, upon determination by the determiner 111 that the utilization channel is useable (YES in step S2), the module controller 112 activates the wireless module 105 (step S4). Thereafter, the determiner 111 sets the retransmission count of the frames stored in the setting information storage 131 to "0" (step S5). Due to such setting, the wireless communication device 1 does not retransmit the frame even when frame transmission fails.

Thereafter, destination confirmation processing is executed to determine whether the wireless communication device 2 assigned the MAC address acquired from the setting information storage 131 is in the communication-capable state (step S6). Due to execution of this destination confirmation processing, a status flag indicating the state of communication with the wireless communication device 2 can be set. The status flag is set to "0" in the case in which communication with the wireless communication device 2 is possible, and is set to "−1" in the case in which communication with the wireless communication device 2 is not possible. Details of the destination confirmation processing are described below.

Thereafter, upon determination that the status flag is set to "−1" (NO in step S7), the determiner 111 outputs the alarm information to the PC 3 via the interface 104 (step S3). Then, the MCS setting processing ends.

Meanwhile, the determiner 111 is assumed to determine that the status flag is set to "0" (YES in step S7). In this case, the transmission success probability calculator 114 acquires from the setting information storage 131 size information indicating the inspection frame size (step S8). Thereafter, the frame generator 113 generates an inspection frame with the size indicated by the size information acquired by the transmission success probability calculator 114 (step S9).

Next, the transmission success probability calculator 114 sets a totalization processing counter "i" for counting the number of repetitions of the success/failure count totalization processing to "0" (step S10). Next, success/failure count totalization processing is executed to totalize the transmission success count and totalize the transmission failure count during transmission of frames of the preset number from the wireless communication device 1 to the wireless communication device 2 (step S11). Details of this success/failure count totalization processing are described below.

Next, the transmission success probability calculator 114 adds the respective transmission success count and transmission failure count for the MCS value calculated by the success/failure count totalization processing, to the transmission success count and the transmission failure count for each MCS value stored in the success/failure count storage region 121 (step S12). The initial values of the transmission success count and the transmission failure count for each MCS value stored in the success/failure count storage region 121 are set to "0". Then, each time the success/failure count totalization processing is executed, the transmission success count and the transmission failure count of each MCS value are updated.

Thereafter, the transmission success probability calculator 114 increments the totalization processing counter "i" by "1" (step S13). Next, the transmission success probability calculator 114 determines whether the value of the totalization processing counter "i" is less than a totalization processing repetition count $i_{max}$ acquired from the setting information storage 131 (step S14). When the transmission success probability calculator 114 determines that the totalization processing counter "i" value is less than the totalization processing repetition count $i_{max}$ (YES in step S14), the processing of step S11 is executed again.

Figure 6:
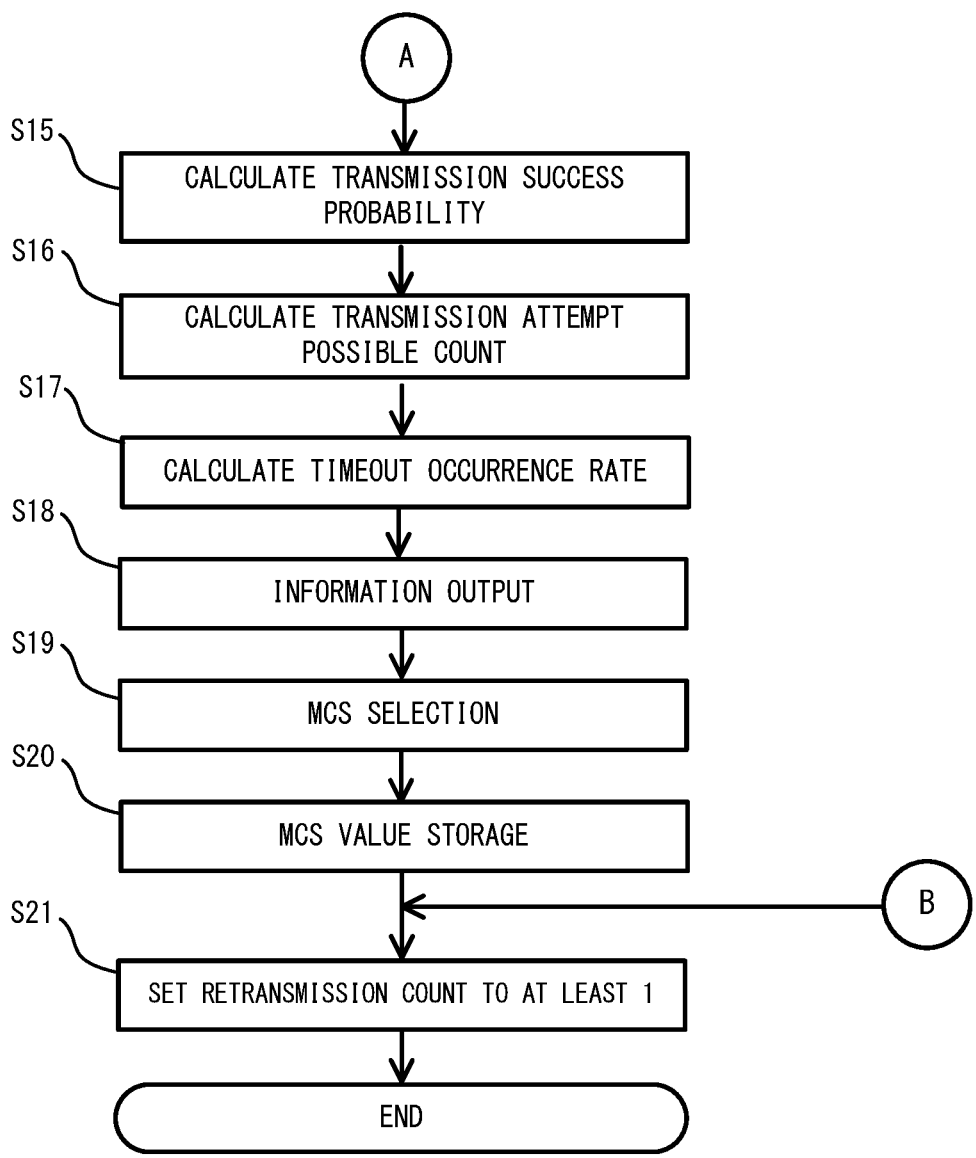
FIG. 6 is another flowchart illustrating MCS setting processing executed by the wireless communication device according to the embodiment.

Meanwhile, upon determination that the value of the totalization processing counter "i" is greater than or equal to the totalization processing repetition count $i_{max}$ (NO in step S14), the transmission success probability calculator 114, as illustrated in FIG. 6, calculates the transmission success probabilities of each MCS value from the transmission success count and the transmission failure count of each MCS value stored in the success/failure count storage region 121 (step S15). The transmission success probability calculator 114 causes the results storage 133 to store the calculated transmission success probability of each MCS value.

Next, the transmission attempt possible count calculator 115 calculates the transmission attempt possible count of the inspection frame occurring within the second reference period (step S16). Here, in the aforementioned manner, transmission attempt possible count calculator 115 uses Formula (1), based on the DBPS corresponding to the MCS used for transmission of the inspection frame and the size of the data included in the inspection frame, to calculate the band occupancy period during transmission of the inspection frame. Then the transmission attempt possible count calculator 115 uses Formula (2), based on the ratio of the second reference period to the calculated band occupancy period, to calculate the transmission attempt possible count. The transmission attempt possible count calculator 115 causes the results storage 133 to store the calculated transmission attempt possible count for each MCS value.

Thereafter, the timeout occurrence rate calculator 116, from the transmission success probability and the transmission attempt possible count in the aforementioned manner, uses Formula (3) to calculate the timeout occurrence rate that is the probability of not receiving the ACK frame from the wireless communication device 2 even though the inspection frame is repeatedly transmitted by the transmission attempt possible count within the second reference period (step S17). Here, the timeout occurrence rate calculator 116 calculates a transmission timeout probability from the transmission success probability and the transmission attempt possible count for each MCS value. The timeout occurrence rate calculator 116 causes the results storage 133 to cause the calculated transmission timeout probability corresponding to each MCS value.

Next, the information output device 118 outputs to the PC 3 via the interface 104 information indicating the transmission success probability, the transmission attempt possible count, and the transmission timeout probability corresponding to each MCS value, which are stored in the results storage 133 (step S18). Here, upon input of the information indicating the transmission success probability, the transmission attempt possible count, and the transmission timeout probability corresponding to each MCS value from the wireless communication device 1, the PC 3 causes a display to display such information as illustrated in FIG. 7, for example. Due to such operation, via the display connected to the PC 3, the user can understand the transmission success probability, the transmission attempt possible count, and the transmission timeout probability corresponding to each MCS value.

Again with reference to FIG. 6, the selector 117 selects one MCS that is suitable for communication between the wireless communication device 1 and the wireless communication device 2 on the basis of the transmission timeout probability corresponding to each MCS value stored in the results storage 133 (step S19). Thereafter, the selector 117 causes the setting information storage 131 to store the selected MCS value (step S20).

The determiner 111 sets the retransmission count of the frames stored by the setting information storage 131 to a preset count of at least one (step S21). By such setting, the wireless communication device 1 performs retransmission of the frame up to the preset count even if transmissions of the frame are failed. The MCS setting processing thereafter ends.

After completion of this MCS setting processing, the wireless communication device 1 begins actual communication with the wireless communication device 2 by the MCS set by such MCS setting processing.

Figure 8:
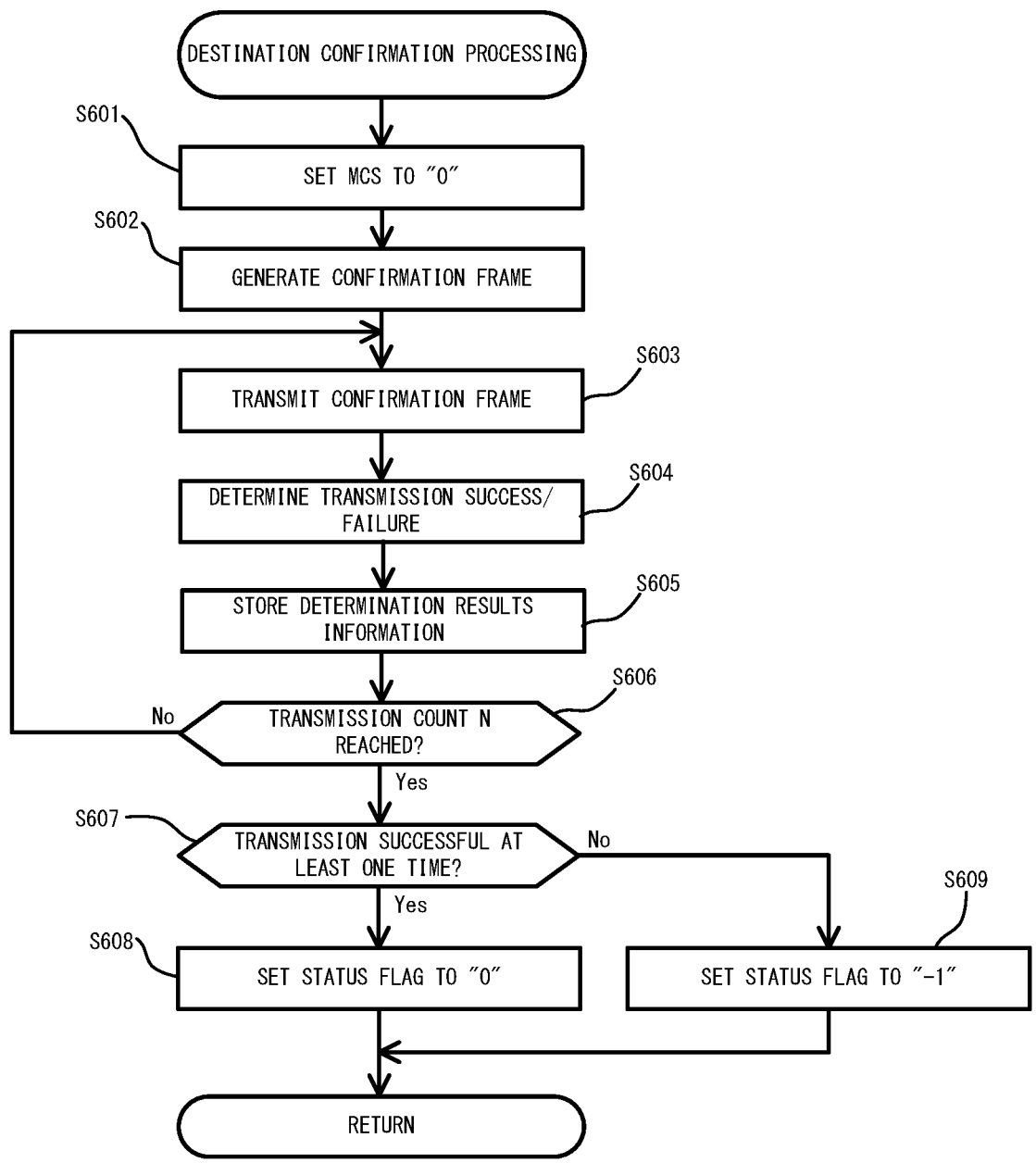
FIG. 8 is a flowchart illustrating destination confirmation processing executed by the wireless communication device according to the embodiment.

Next, the destination confirmation processing executed by the wireless communication device 1 according to the present embodiment is described in detail with reference to FIG. 8. Firstly, the determiner 111 sets the MCS value stored in the setting information storage 131 to "0" (step S601). Due to such setting, the wireless communication device 1 executes communication with the wireless communication device 2 by the MCS by which the confirmation frame most easily arrives at the wireless communication device 2.

Thereafter, the frame generator 113 generates the confirmation frame for confirming whether the communication counterparty of the wireless communication device 1 is in the communication-capable state (step S602). This confirmation frame is formed from a frame addressed to the MAC address assigned, for example, to the wireless communication device 2 serving as the communication counterparty of the wireless communication device 1.

Next, the module controller 112 transmits to the wireless communication device 2 via the wireless module 105 the confirmation frame generated by the frame generator 113 (step S603). Here, upon reception of the confirmation frame from the wireless communication device 1, the wireless communication device 2 transmits the ACK frame to the wireless communication device 1.

Thereafter, the determiner 111 determines whether the transmission of the confirmation frame is successful (step S604). Here, the determiner 111 determines that the transmission of the confirmation frame is successful, in the case of reception of the ACK frame from the wireless communication device 2 within the third reference period after the module controller 112 transmits the confirmation frame. Meanwhile, in the case of the ACK frame not being received by passage of the third reference period after the module controller 112 transmits the confirmation frame, the determiner 111 determines that there is failure of transmission of the confirmation frame. The third reference period is preset, for example, to 4 msec. Thereafter, the determiner 111 causes the destination confirmation determination results storage region 122 to store the determination results information indicating the results of the determination of success/failure of the transmission of the confirmation frame (step S605).

Thereafter, the determiner 111 determines whether the transmission count of the confirmation frame reaches the destination confirmation transmission count N acquired from the setting information storage 131 (step S606). Upon determination by the determiner 111 that the transmission count of the confirmation frame does not reach the destination confirmation transmission count N (NO in step S606), the processing of step S603 is executed again.

Meanwhile, upon determination that the transmission count of the confirmation frame has reached the destination confirmation transmission count N (YES in step S606), the determiner 111 refers to the destination confirmation determination results storage region 122, and determines whether the transmission of the confirmation frame is successful at least one time (step S607). Upon determination of success in transmission of the confirmation frame at least one time (YES in step S607), the determiner 111 sets to "0" the status flag that indicates whether the wireless communication device 2 is in the communication-capable state (step S608). Meanwhile, upon determination of failure of all the transmissions of the confirmation frame (NO in step S607), the determiner 111 sets the status flag to "−1" (step S609). Thereafter, the processing of step S7 shown in FIG. 5 is executed as aforementioned.

Figure 9:
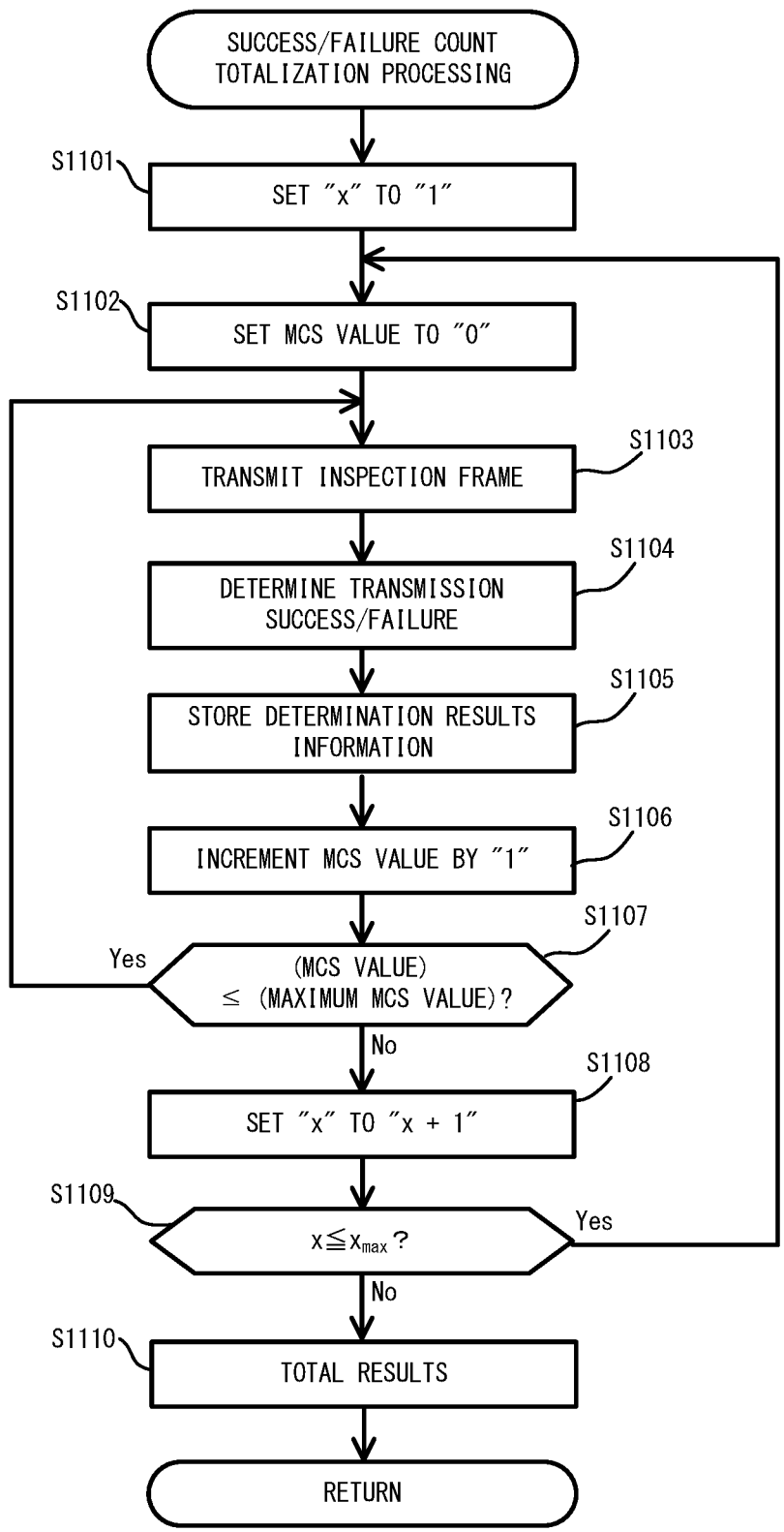
FIG. 9 is a flowchart illustrating success/failure count totalization processing executed by the wireless communication device according to the embodiment.

Next, the success/failure count totalization processing executed by the wireless communication device 1 according to the present embodiment is described in detail with reference to FIG. 9. Firstly, the transmission success probability calculator 114 sets to "1" a value x of the determination counter for counting the number of repeats of the determination of whether the transmission of the inspection frame is successful (step S1101). Next, the transmission success probability calculator 114 sets to "0" the MCS value subject to determination of whether the transmission of the inspection frame is successful (step S1102). Specifically, the transmission success probability calculator 114 sets to "0" the MCS value stored in the setting information storage 131.

Next, the module controller 112 transmits the inspection frame to the wireless communication device 2 at the DBPS corresponding to the MCS value stored in the setting information storage 131 (step S1103). Here, upon receiving the inspection frame from the wireless communication device 1, the wireless communication device 2 transmits the ACK frame to the wireless communication device 1.

Thereafter, the transmission success probability calculator 114 determines whether the transmission of the inspection frame is successful (step S1104). Here, in the case in which the ACK frame is received prior to passage of the preset first reference period after the module controller 112 transmits the inspection frame, the transmission success probability calculator 114 determines that the transmission of the inspection frame is successful. Meanwhile, in the case in which the ACK frame is not received prior to passage of the preset first reference period after the module controller 112 transmits the inspection frame, the transmission success probability calculator 114 determines that the transmission of the inspection frame fails. The first reference period is set to 4 msec, for example. Thereafter, the transmission success probability calculator 114 causes the determination results history storage region 123 to store the determination results information indicating the determination result of success/failure of the transmission of the inspection frame (step S1105).

Next, the transmission success probability calculator 114 increments by "1" the MCS value subject to determination of whether the transmission of the inspection frame is successful (step S1106). Thereafter, the transmission success probability calculator 114 determines whether the MCS value subject to determination is less than or equal to a maximum MCS value among MCS values capable of use for communication with the wireless communication device 2 (step S1107). Upon determination by the transmission success probability calculator 114 that the MCS value subject to determination is less than or equal to the maximum MCS value (YES in step S1107), the processing of step S1103 is executed again.

Meanwhile, upon determination that the MCS value subject to determination is larger than the maximum MCS value (NO in step S1107), the transmission success probability calculator 114 increments by "1" the value x of the determination counter (step S1108). Thereafter, the transmission success probability calculator 114 determines whether the value x of the determination counter is less than or equal to a determination repetition count $x_{max}$ acquired from the setting information storage 131 (step S1109). Upon determination by the transmission success probability calculator 114 that the value x of the determination counter is less than or equal to the determination repetition count x (YES in step S1109), the processing of step S1102 is executed again.

Meanwhile, upon determination that the value x of the determination counter is greater than the determination repetition count $x_{max}$ (NO in step S1109), the transmission success probability calculator 114 refers to the history of the determination results stored in the determination results history storage region 123, and totals the results of the transmission success count and the transmission failure count of inspection for each MCS value (step S1110). Thereafter, the above-mentioned processing step S12 shown in FIG. 5 is executed.

Next, the below-listed Table 1 illustrates an example of the transmission success probability, and the timeout occurrence rate corresponding thereto, occurring in the case of the wireless communication device 1 according to the present embodiment communicating with the wireless communication device 2 by MCSs corresponding to MCS values of "0" to "7".

TABLE 1

| MCS | Transmission success probability (%) | DBPS | Transmission period (µsec) | transmission attempt possible count | Timeout occurrence rate |
|---|---|---|---|---|---|
| 0 | 80 | 26 | 1188.8 | 8 | 0.00000256 |
| 1 | 80 | 52 | 634.4 | 15 | $3.2768 \times 10^{-11}$ |
| 2 | 80 | 78 | 450.8 | 22 | $4.1943 \times 10^{-16}$ |
| 3 | 75 | 104 | 357.2 | 27 | $5.55112 \times 10^{-17}$ |
| 4 | 70 | 156 | 267.2 | 37 | $4.50284 \times 10^{-20}$ |
| 5 | 62 | 208 | 220.4 | 45 | $1.23101 \times 10^{-19}$ |
| 6 | 60 | 234 | 206.0 | 48 | $7.92282 \times 10^{-20}$ |
| 7 | 50 | 260 | 191.6 | 52 | $2.22045 \times 10^{-16}$ |

Figure 10A:
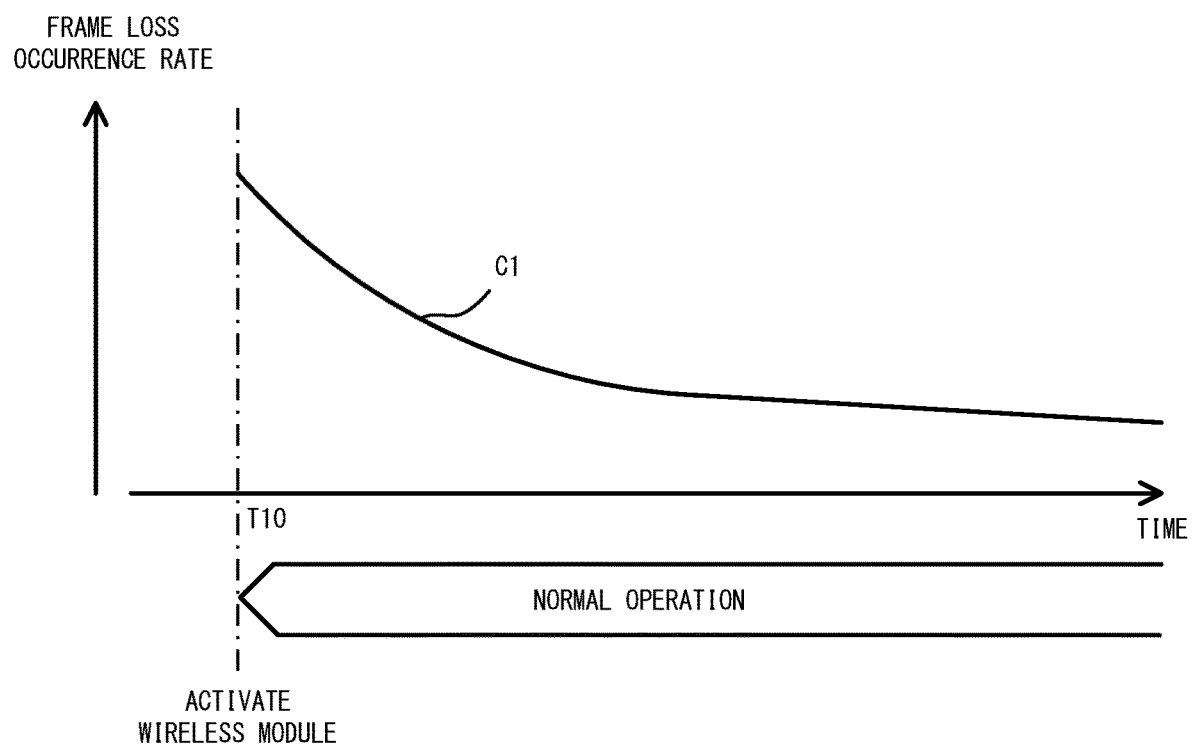
FIG. 10A illustrates schematically change of a frame loss occurrence rate for a wireless communication device according to a comparative example.

Here, the timeout occurrence rate threshold is assumed to be set to $1 \times 10^{16}$, and the selector 117 is assumed to select one among the MCS values "3" to "6". Meanwhile, some wireless communication devices set the MCS value to the maximum value, for example, and start normal communication (referred to hereinafter as "normal operation") with the other wireless communication device, and decrease the MCS value in a stepwise manner in response to the frame loss occurrence rate after the start of normal operation (this type of wireless communication device is referred to hereinafter as the "wireless communication device according to the comparative example"). In the case of this wireless communication device of the comparative example, as illustrated in FIG. 10A, the wireless module is activated at a time T10, and normal operation begins. Then, as indicated by the curve C1 of FIG. 10A, the frame loss occurrence rate is high in the period during which the wireless communication device is searching for a suitable MCS after a time T10.

Figure 10B:
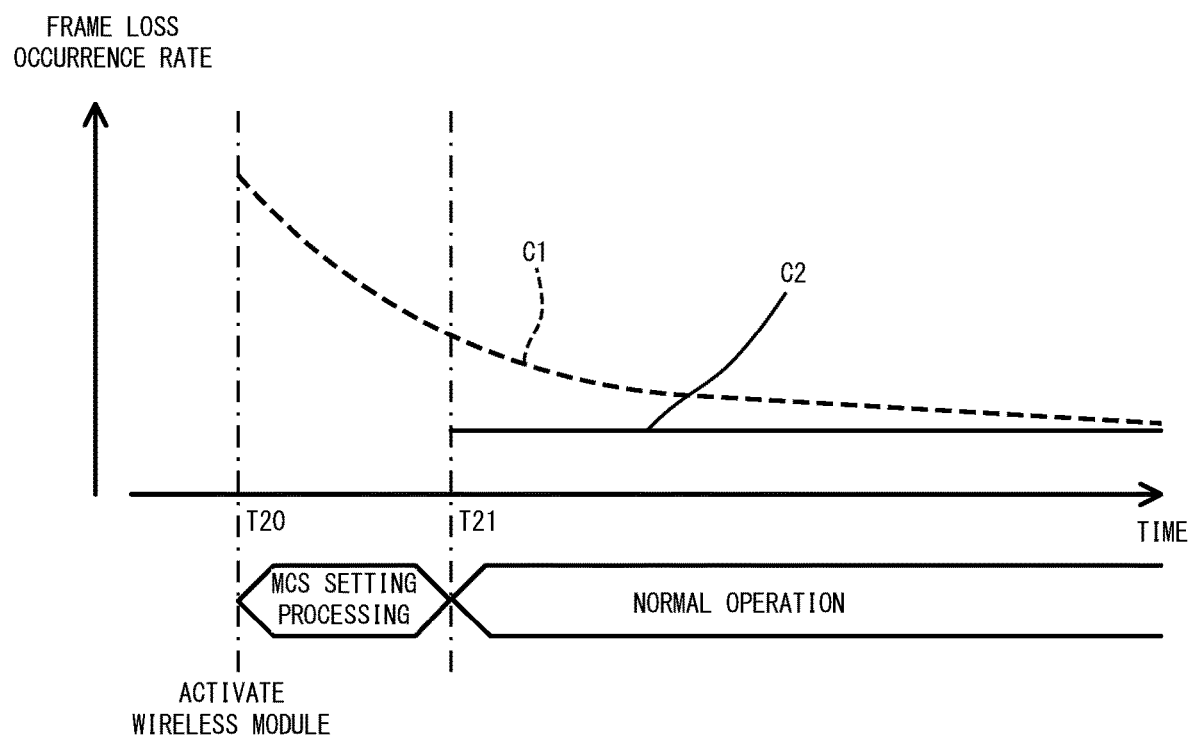
FIG. 10B illustrates schematically change in the frame loss occurrence rate for the wireless communication device according to the embodiment.

In contrast, according to the wireless communication device 1 according to the present embodiment, the timeout occurrence rate calculator 116 calculates the timeout occurrence rate from the transmission success probability and the transmission attempt possible count of the inspection frame, and the selector 117 selects the MCS for use in communication with the wireless communication device 2 in accordance with whether the timeout occurrence rate is less than or equal to the preset occurrence rate threshold. Due to such operation, for example, after the selector 117 firstly selects the MCS value for which the timeout occurrence rate is low, the wireless communication device 1 can start normal communication with the wireless communication device 2 by the MCS corresponding to the selected MCS value. That is to say, in the case of the wireless communication device 1 according to the present embodiment, as illustrated in FIG. 10B, after the wireless module 105 is activated at a time T20, firstly a suitable MCS is set by executing the MCS setting processing. Then, the wireless communication device 1 starts normal operation after completion of the setting of the MCS at a time T21. Thus, as indicated by a curve C2 of FIG. 10B, after the time T21, a transition occurs to a stable state in which the frame loss occurrence rate is relatively low. In this manner, the wireless communication device 1 according to the present embodiment has an advantage that frame loss is reduced as compared to the wireless communication device according to the comparative example, in which the search for the MCS suitable for communication with the other wireless communication device occurs after the start of normal operation.

Moreover, the transmission attempt possible count calculator 115 according to the present embodiment calculates the band occupancy period during transmission of the inspection frame on the basis of the DBPS corresponding to the MCS used in transmission of the inspection frame and the size of the data included in the inspection frame. Further, the transmission attempt possible count calculator 115 calculates the transmission attempt possible count on the basis of the ratio of the second reference period to the calculated band occupancy period. Such operation enables the timeout occurrence rate calculator 116 to calculate the timeout occurrence rate with good accuracy, and thus the selector 117 can select the MCS that is suitable for the state of communication between the wireless communication devices 1 and 2.

Furthermore, the wireless communication device 1 according to the present embodiment is equipped with the determiner 111 that determines whether the wireless communication device 2 is in the communication-capable state on the basis of whether the ACK frame is received from the wireless communication device 2 within the preset third reference period after the transmission of the confirmation frame. Due to such configuration, for example, the useless execution of MCS setting processing can be prevented in a state in which the wireless communication device 2 is unable to communicate with the wireless communication device 1.

Modified Example

Although an embodiment of the present disclosure is described above, the present disclosure is not limited to the configuration of the aforementioned embodiment. In the description of the embodiment, the first reference period, the second reference period, and the third reference period are each set to 4 msec. Although these reference periods are set as periods for determination of whether the transmission is successful, and thus these can be considered in practice to have similar values, there is no inherent requirement that these three types of reference periods are the same.

Moreover, for example, when multiple MCSs are classified on the basis of the modulation scheme, the selector 117 firstly calculates the proportion of the MCSs for which the timeout occurrence rate is less than or equal to the occurrence rate threshold for each modulation scheme. Then, the selector 117 may be configured to select the MCS for use in communication with the wireless communication device 2 from among MCSs corresponding to the modulation scheme having the maximum calculated proportion. The present modified example is described in detail below.

In the present modified example, the DBPS information storage 132 is configured to store information indicating the modulation scheme corresponding to each MCS value as indicated in FIG. 11, for example. Although the modulation schemes corresponding to all of the MCS values are not listed in FIG. 11, for example, as the following manner, MCS values of "0" and "1" are taken to correspond to a BPSK modulation scheme, MCS values of "2" and "3" are taken to correspond to a QPSK modulation scheme, MCS values of "4" and "5" are taken to correspond to a 16QAM modulation scheme, MCS values of "6" and "7" are taken to correspond to a 64QAM modulation scheme, or the like. Then the selector 117 refers to the information indicating the modulation scheme in the DBPS information storage 132 to classify the multiple MCS values on the basis of the modulation scheme.

Next, the MCS setting processing executed by the wireless communication device 1 according to the present modified example is described. Please note that, content of the MCS setting processing and the destination confirmation processing executed by the wireless communication device 1 according to the present modified example is similar as the content of the MCS setting processing and the destination confirmation processing according to the embodiment. Moreover, the MCS setting processing according to the present modified example differs from the MCS setting processing according to the embodiment only in the content of the MCS selection processing indicated in step S19 of FIG. 6. The content of this MCS selection processing is described in detail below with reference to FIG. 12. Firstly, the selector 117 determines the modulation scheme subject to calculation of the proportion of the MCS values for which the timeout occurrence rate is less than or equal to the occurrence rate threshold (step S1901). Here, the selector 117, for example, determines the subject modulation scheme from among the modulation schemes BPSK, QPSK, 16QAM, and 64QAM.

Next, the selector 117 specifies the MCS values having the determined modulation scheme classification (step S1902). In the case in which the determined modulation scheme is BPSK, for example, the selector 117 specifies "0" and "1" as the MCS values.

Next, the selector 117 calculates for the specified MCS values the proportion for which the timeout occurrence rate is less than or equal to the preset occurrence rate threshold (step S1903). For example, the timeout occurrence rate for each MCS threshold is taken to be the value shown in Table 1 for the embodiment. Then the occurrence rate threshold is taken to be set to "$1 \times 10^{-16}$". In this case, when the determined modulation scheme is BPSK, the timeout occurrence rate is larger than the occurrence rate threshold for both the MCS values "0" and "1", and thus the proportion of MCS values for which the timeout occurrence rate is less than or equal to the occurrence rate threshold is "0". Meanwhile, when the determined modulation scheme is 16QAM, the timeout occurrence rate is less than or equal to the occurrence rate threshold for both of the MCS values "4" and "5", and thus the proportion of MCS values for which the timeout occurrence rate is less than or equal to the occurrence rate threshold is "1".

Thereafter, the selector 117 determines whether there is still another modulation scheme not subject to calculation of the proportion of MCS values for which the timeout occurrence rate is less than or equal to the occurrence rate threshold (step S1904). Upon determination that there still is another modulation scheme not subject to calculation of the proportion of MCS values for which the timeout occurrence rate is less than or equal to the occurrence rate threshold (YES in step S1904), the selector 117 executes the processing of step S1901 again.

Meanwhile, upon determination that the proportion of MCS values for which the timeout occurrence rate is less than or equal to the occurrence rate threshold is calculated for all the modulation schemes (NO in step S1904), the selector 117 specifies the modulation scheme for which the proportion of MCS values for which the timeout occurrence rate is less than or equal to the occurrence rate threshold is maximum (step S1905). For example, the timeout occurrence rate for each MCS values is assumed to be the value indicated in Table 1 for the embodiment aforementioned. Further, the occurrence rate threshold is assumed to be set to "$1 \times 10^{-16}$". In this case, when the MCS values are "0" and "1" as in the classifications according to the modulation scheme BPSK, the timeout occurrence rate is greater than the occurrence rate threshold for both values, and thus the proportion of the MCS values for which the timeout occurrence rate is less than or equal to the occurrence rate threshold is "0". Moreover, when the MCS values are "2" and "3" as in the classifications according to the modulation scheme QPSK, the timeout occurrence rate is greater than the occurrence rate threshold for the MCS value "2", and the timeout occurrence rate is less than the occurrence rate threshold for the MCS value "3". Thus, the proportion of MCS values for which the timeout occurrence rate is less than or equal to the occurrence rate threshold is "0.5". When the MCS values are "4" and "5" as in the classifications according to the modulation scheme 16QAM, the timeout occurrence rate is less than or equal to the occurrence rate threshold for both such values, and thus the proportion of MCS values for which the timeout occurrence rate is less than or equal to the occurrence rate threshold is "1". Moreover, when the MCS values are "6" and "7" as in the classifications according to the modulation scheme 64QAM, the timeout occurrence rate is less than or equal to the occurrence rate threshold for the MCS value "6", and the timeout occurrence rate is larger than the occurrence rate threshold for the MCS value "7". Thus, the proportion of MCS values for which the timeout occurrence rate is less than or equal to the occurrence rate threshold is "0.5". In this case, the selector 117 specifies the modulation scheme 16QAM as the modulation scheme for which the proportion of MCS values for which the timeout occurrence rate is less than or equal to the occurrence rate threshold is maximum.

Next, the selector 117, from among the modulation scheme having the maximum proportion of MCS values for which the timeout occurrence rate is less than or equal to the occurrence rate threshold, selects an MCS value (step S1906). For example, in the case in which the modulation scheme 16QAM is specified as the modulation scheme for which the proportion of MCS values for which the timeout occurrence rate is less than or equal to the occurrence rate threshold is maximum, the selector 117 selects either the MCS value "4" or "5". Thereafter, the processing of step S20 shown in FIG. 6 as described for the embodiment is executed.

According to such configuration, the selector 117 selects the MCS value on the basis of the modulation scheme corresponding to each MCS value. Such configuration is advantageous in that an MCS is selected that is more suitable for communication with the wireless communication device 2, and frame loss occurring in the communication between the wireless communication devices 1 and 2 can be reliably decreased.

Although an example is described in the embodiment in which the wireless communication device 1 communicates with just a single unit that is the wireless communication device 2, this example is not limiting, and for example, the wireless communication device 1 may be configured to communicate with a specified plurality of wireless communication devices. In this case, the wireless communication device 1 may be configured to execute, at the setting times thereof, MCS setting processing respectively for each of the specified wireless communication devices.

In the embodiment, an example is described in which the wireless communication device 1 sets the MCS used for communication with the wireless communication device 2 by the selector 117 causing the setting information storage 131 to store the selected MCS value. However, such configuration is not limiting, and for example, a configuration may be used in which the selector 117 outputs to the PC 3 via the interface 104 information indicating the selected MCS value. In this case, the PC 3 may be configured to display on the screen the MCS value inputted from the wireless communication device 1, and the user may confirm an MCS value displayed on the screen so that the user can set the MCS to be used for communication between the wireless communication device 1 and the wireless communication device 2.

In the embodiment, the wireless communication device 1 may be configured to execute the MCS setting processing at multiple preset times in 24 hours a day, and to cause the setting information storage 131 to store each MCS value associated with the each time. Further, the wireless communication device 1 may be configured to communicate with the wireless communication device 2 using the MCS corresponding to the associated MCS value stored in the setting information storage 131 for each arrival of the preset plurality of times.

According to such configuration, communication between the wireless communication devices 1 and 2 can be performed by the MCS suitable for communication between the wireless communication devices 1 and 2 even in a case where these devices are used in an environment that changes, with respect to the state of communication between the wireless communication devices 1 and 2, in multiple timeslots occurring in a single day.

Each type of function of the wireless communication device 1 according to the present disclosure may be achieved by use of a computer system equipped with a wireless communication module, without use of a dedicated system. For example, a program for execution of the aforementioned operations by a computer connected to a network may be contained and distributed on a computer system-readable non-transient recording medium (such as a CD-ROM), and the wireless communication device 1 executing the aforementioned processing may be achieved by installing the program on the computer system.

Moreover, the method of providing the program to the computer is freely selected. For example, the program may be uploaded to a server via a communication line, and may be distributed to the computer via the communication line. Then, the computer starts this program and executes the program under control of the OS in the same manner as other applications. Due to such operation, the computer functions as the wireless communication device 1 to execute the aforementioned processing.

The foregoing describes some example embodiments for explanatory purposes.

Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2016-233202, filed on Nov. 30, 2016, the entire disclosure of which is incorporated by reference herein.

INDUSTRIAL APPLICABILITY

The wireless communication device of the present disclosure is suitable as a wireless terminal device for digital signage used in a commercial facility or factory.

REFERENCE SIGNS LIST 1, 2 Wireless communication device
3 PC
4 Monitor
101 CPU
102 Primary storage
103 Auxiliary storage
104 Interface
105 Wireless module
111 Determiner
112 Module controller
113 Frame generator
114 Transmission success probability calculator
115 Transmission attempt possible count calculator
116 Timeout occurrence rate calculator
117 Selector
118 Information output device
121 Success/failure count storage region
122 Destination confirmation determination results storage region
123 Determination results history storage region
131 Setting information storage
132 DBPS information storage
133 Results storage

The invention claimed is:

1. A wireless communication device comprising:
   a transmission success probability calculator implemented as a programmed processing unit and configured to calculate a transmission success probability that is a probability of receiving a confirmation response frame from another wireless communication device within a preset first reference period after transmission of a first frame, the first frame being transmitted multiple times to the other wireless communication device;
   a transmission attempt possible count calculator implemented as the programmed processing unit and configured to calculate a transmission attempt possible count of the first frame during a second reference period;
   a timeout occurrence rate calculator implemented as the programmed processing unit and configured to calculate, from the transmission success probability and the transmission attempt possible count, a timeout occurrence rate that is a probability of not receiving, within the second reference period, the confirmation response frame from the other wireless communication device even through the first frame is repeatedly transmitted, the number of repeated transmissions being the transmission attempt possible count; and
   a selector implemented as the programmed processing unit and configured to select a modulation and coding scheme to use in communication with the other wireless communication device in accordance with whether the timeout occurrence rate is less than or equal to a preset occurrence rate threshold.

2. The wireless communication device according to claim 1, wherein the transmission attempt possible count calculator calculates, based on (i) a transmission rate corresponding to the modulation and coding scheme used in transmission of the first frame and (ii) a size of data included in the first frame, a band occupancy period during transmission of the first frame, and calculates the transmission attempt possible count based on a ratio of the second reference period to the calculated band occupancy period.

3. The wireless communication device according to claim 2, further comprising:
   a determiner implemented as the programmed processing unit and configured to determine whether the other wireless communication device is in a communication-capable state based on whether the confirmation response frame is received from the other wireless communication device within a preset third reference period after transmission of a second frame, the second frame being transmitted multiple times to the other wireless communication device.

4. The wireless communication device according to claim 3, wherein
   the timeout occurrence rate calculator, for each of a plurality of the modulation and coding scheme, calculates the timeout occurrence rate during transmission of the first frame using the modulation and coding scheme; and
   the selector (i) for each modulation scheme, calculates a proportion of the modulation and coding schemes for which the timeout occurrence rate is less than or equal to the occurrence rate threshold, the modulation and coding schemes being classified according to the modulation scheme, and (ii) selects, as the modulation and coding scheme used for communication with the other wireless communication device, a modulation and coding scheme corresponding to a modulation scheme having a maximum calculated proportion from among modulation and coding schemes corresponding to the modulation scheme having a maximum calculated proportion.

5. The wireless communication device according to claim 2, wherein
   the timeout occurrence rate calculator, for each of a plurality of the modulation and coding scheme, calculates the timeout occurrence rate during transmission of the first frame using the modulation and coding scheme; and
   the selector (i) for each modulation scheme, calculates a proportion of the modulation and coding schemes for which the timeout occurrence rate is less than or equal to the occurrence rate threshold, the modulation and coding schemes being classified according to the modulation scheme, and (ii) selects, as the modulation and coding scheme used for communication with the other wireless communication device, a modulation and coding scheme corresponding to a modulation scheme having a maximum calculated proportion from among modulation and coding schemes corresponding to the modulation scheme having a maximum calculated proportion.

6. The wireless communication device according to claim 1, further comprising:
   a determiner implemented as the programmed processing unit and configured to determine whether the other wireless communication device is in a communication-capable state based on whether the confirmation response frame is received from the other wireless communication device within a preset third reference period after transmission of a second frame, the second frame being transmitted multiple times to the other wireless communication device.

7. The wireless communication device according to claim 6, wherein
   the timeout occurrence rate calculator, for each of a plurality of the modulation and coding scheme, calculates the timeout occurrence rate during transmission of the first frame using the modulation and coding scheme; and
   the selector (i) for each modulation scheme, calculates a proportion of the modulation and coding schemes for which the timeout occurrence rate is less than or equal to the occurrence rate threshold, the modulation and coding schemes being classified according to the modulation scheme, and (ii) selects, as the modulation and coding scheme used for communication with the other wireless communication device, a modulation and coding scheme corresponding to a modulation scheme having a maximum calculated proportion from among modulation and coding schemes corresponding to the modulation scheme having a maximum calculated proportion.

8. The wireless communication device according to claim 1, wherein
   the timeout occurrence rate calculator, for each of a plurality of the modulation and coding scheme, calculates the timeout occurrence rate during transmission of the first frame using the modulation and coding scheme; and
   the selector (i) for each modulation scheme, calculates a proportion of the modulation and coding schemes for which the timeout occurrence rate is less than or equal to the occurrence rate threshold, the modulation and coding schemes being classified according to the modulation scheme, and (ii) selects, as the modulation and coding scheme used for communication with the other wireless communication device, a modulation and coding scheme corresponding to a modulation scheme having a maximum calculated proportion from among modulation and coding schemes corresponding to the modulation scheme having a maximum calculated proportion.

9. A wireless communication method comprising:
a step of calculating a transmission success probability that is a probability of receiving a confirmation response frame from another wireless communication device within a preset first reference period after transmission of a first frame, the first frame being transmitted multiple times to the other wireless communication device;
a step of calculating a transmission attempt possible count of the first frame during a second reference period;
a step of calculating, from the transmission success probability and the transmission attempt possible count, a timeout occurrence rate that is a probability of not receiving, within the second reference period, the confirmation response frame from the other wireless communication device even through the first frame is repeatedly transmitted, the number of repeated transmissions being the transmission attempt possible count; and
a step of selecting a modulation and coding scheme to use in communication with the other wireless communication device in accordance with whether the timeout occurrence rate is less than or equal to a preset occurrence rate threshold.

10. The wireless communication method according to claim 9, further comprising a step of calculating a band occupancy period during transmission of the first frame, based on at least one of (i) a transmission rate corresponding to the modulation and coding scheme used in transmission of the first frame, or (ii) a size of data included in the first frame.

11. The wireless communication method according to claim 10, wherein the transmission attempt possible count is calculated based on a ratio of the second reference period to the calculated band occupancy period.

12. The wireless communication method according to claim 9, further comprising a step of determining whether the other wireless communication device is in a communication-capable state based on whether the confirmation response frame is received from the other wireless communication device within a preset third reference period after transmission of a second frame, the second frame being transmitted multiple times to the other wireless communication device.

13. The wireless communication method according to claim 9, wherein the timeout occurrence rate is calculated for each of a plurality of the modulation and coding scheme during transmission of the first frame.

14. The wireless communication method according to claim 13, further comprising:
for each modulation scheme, a step of calculating a proportion of the modulation and coding schemes for which the timeout occurrence rate is less than or equal to the occurrence rate threshold, the modulation and coding schemes being classified according to the modulation scheme, and
a step of selecting, as the modulation and coding scheme used for communication with the other wireless communication device, a modulation and coding scheme corresponding to a modulation scheme having a maximum calculated proportion from among modulation and coding schemes corresponding to the modulation scheme having a maximum calculated proportion.

15. A non-transitory recording medium storing a program for causing a computer to:
to calculate a transmission success probability that is a probability of receiving a confirmation response frame from another wireless communication device within a preset first reference period after transmission of a first frame, the first frame being transmitted multiple times to the other wireless communication device;
calculate a transmission attempt possible count of the first frame during a second reference period;
calculate, from the transmission success probability and the transmission attempt possible count, a timeout occurrence rate that is a probability of not receiving, within the second reference period, the confirmation response frame from the other wireless communication device even through the first frame is repeatedly transmitted, the number of repeated transmissions being the transmission attempt possible count; and
select a modulation and coding scheme to use in communication with the other wireless communication device in accordance with whether the timeout occurrence rate is less than or equal to a preset occurrence rate threshold.

* * * * *